Patented Mar. 9, 1937

2,073,000

UNITED STATES PATENT OFFICE 2,073,000

TRISAZODYESTUFFS

Heinrich Clingestein, Cologne-on-the-Rhine, and Eugen Glietenberg and Oskar Goos, Leverkusen-I. G.-Werk, Germany, assignors to General Aniline Works, Inc., New York, N. Y., a corporation of Delaware No Drawing. Application December 14, 1933, Serial No. 702,424. In Germany December 21, 1932

5 Claims. (Cl. 260—74)

The present invention relates to trisazodyestuffs, more particularly it relates to dyestuffs which may be represented by the probable general formula:

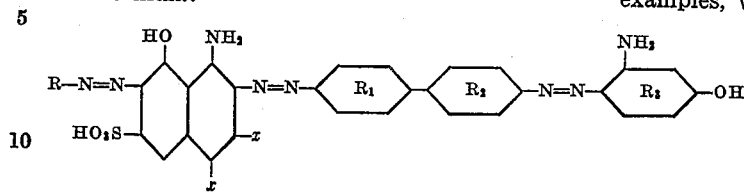

wherein R stands for the radical of a diazotization component, such as for the radical of a diazotized amine of the benzene or naphthalene series, one $x$ stands for a sulfonic acid group and the other $x$ stands for a hydrogen atom, wherein the benzene nuclei $R_1$ and $R_2$ may bear substituents, such as alkyl, alkoxy, halogen or the carboxylic acid group and wherein the benzene nucleus $R_3$ is substituted in such a manner that the coupling only enters in p-position with respect to the hydroxy group, this being achieved, for example, by a substituent, such as halogen, alkyl or alkoxy, in p-position to the amino group.

Our new dyestuffs are obtainable by tetrazotizing a p,p'-diaminodiphenyl compound, coupling with one molecular proportion of 1-amino-8-hydroxynaphthalene-3,6- or -4,6-disulfonic acid in a mineral acid solution, coupling the intermediate product formed in a sodaalkaline solution with a diazo compound, and finally coupling with such a nuclear substitution product of m-aminophenol coupling only in p-position with respect to the hydroxy group.

Our new dyestuffs are in form of their alkali metal salts generally dark powders, dyeing cotton generally greenish to blue to black shades of good fastness to acids. They are further distinguished by dyeing the different fibres in mixed fabrics, for example of cotton, wool, silk and artificial silk, the same shades.

The invention is illustrated by the following examples, without being limited thereto:

*Example 1.*—184 kgs. of benzidine are tetrazotized in the usual manner and coupled in hydrochloric acid solution with 341 kgs. of 1-amino-8-hydroxynaphthalene-3,6-disulfonic acid. When the coupling is complete, the intermediate product formed is coupled with diazobenzene prepared from 93 kgs. of aniline in sodaalkaline solution. When the diazobenzene has disappeared, an aqueous solution from 180 kgs. of the hydrochloric acid salt of 6-chloro-3-aminophenol is added. The dyestuff having in its free state the following formula:

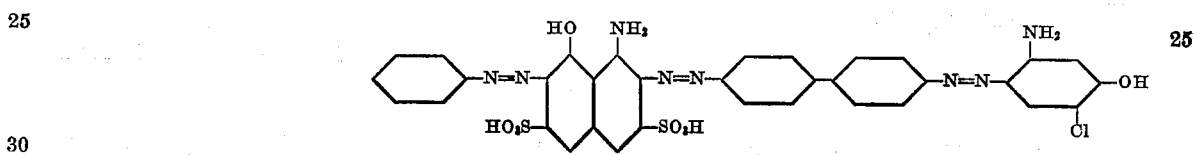

dyes cotton greenish-black shades of excellent fastness to acids.

By substituting the 1-amino-8-hydroxynaphthalene-3,6-disulfonic acid by 1-amino-8-hydroxynaphthalene-4,6-disulfonic acid, there is obtained a dyestuff of similar properties, dyeing somewhat more blue shades.

*Example 2.*—By substituting the diazobenzene in the combination of Example 1 by the equivalent quantity of diazotized p-sulfanilic acid, there is obtained a dyestuff having in its free state the following formula:

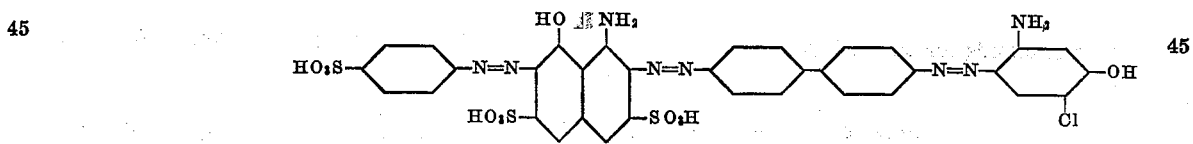

dyeing leather black shades of a remarkable fastness to acids.

*Example 3.*—By substituting the 6-chloro-3-aminophenol in the combination of Example 1 by the equivalent quantity of 4-amino-2-cresol ($CH_3=1$) there is obtained a dyestuff having in its free state the following formula:

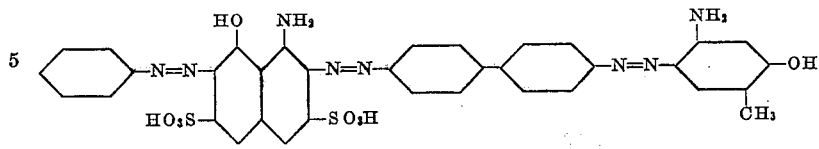

dyeing cotton somewhat more reddish shades of good fastness to acids and having the valuable property of dyeing the different fibres in mixed fabrics the same shades.

By substituting the benzidine by the equivalent quantity of 4,4'-diamino-3,3'-dimethoxydiphenyl or of 4,4'-diamino-3,3'-dimethyldiphenyl or of 4,4'-diamino-3,3'-dichlorodiphenyl or of 4,4'-diaminodiphenyl-3,3'-dicarboxylic acid or of 4,4'-diamino-2-nitrodiphenyl, there are obtained dyestuffs exerting similar properties.

Further by substituting the diazobenzene by other monodiazo compounds, such as of chloroaniline, toluidine, anisidine, 1-aminonaphthalene-4-sulfonic acid and the like, and working otherwise according to the directions given in Paragraph 1, there are obtained dyestuffs of similar properties.

*Example 4.*—By substituting the 6-chloro-3-aminophenol in the combination of Example 1 by an equivalent quantity of 6-methoxy-3-aminophenol there is obtained a dyestuff having in its free state the following formula:

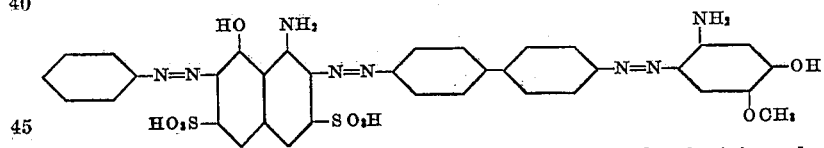

dyeing cotton more greenish shades of good fastness to acids.

We claim:
1. Trisazodyestuffs of the general formula:

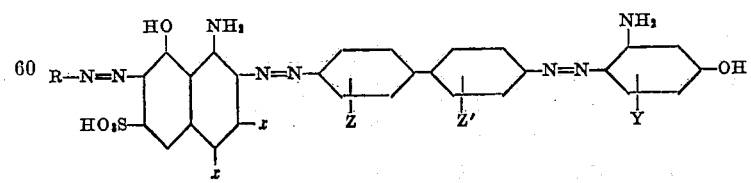

wherein R stands for the radical of a diazotized aromatic amine, one $x$ stands for a sulfonic acid group and the other $x$ stands for a hydrogen atom, wherein Z and Z' stand for members selected from the group consisting of hydrogen, an alkyl, an alkoxy, halogen, the nitro group and the carboxylic acid group and wherein Y stands for a member selected from the group consisting of hydrogen, alkyl, alkoxy and halogen, being in the form of their alkali metal salts generally dark powders, dyeing cotton generally greenish to blue to black shades of good fastness to acids and dyeing the different fibres in mixed fabrics the same shades.

2. Trisazodyestuffs of the general formula:

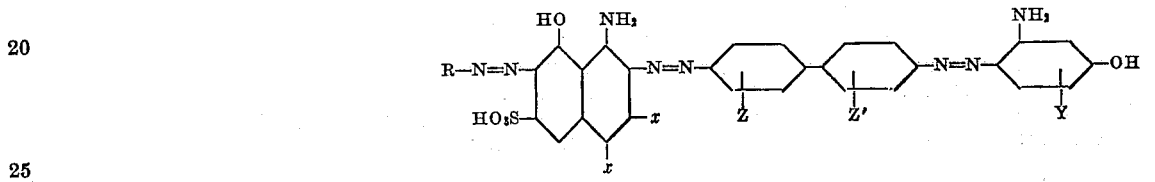

wherein R stands for the radical of a diazotized aromatic amine, one $x$ stands for a sulfonic acid group and the other $x$ stands for a hydrogen atom, wherein Z and Z' stand for members selected from the group consisting of hydrogen, an alkyl, an alkoxy, halogen, the nitro group and the carboxylic acid group and wherein Y stands for a member selected from the group consisting of hydrogen, alkyl, alkoxy and halogen, being in the form of their alkali metal salts generally dark powders, dyeing cotton generally greenish to blue to black shades of good fastness to acids and dyeing the different fibres in mixed fabrics the same shades.

3. The trisazodyestuff of the following formula:

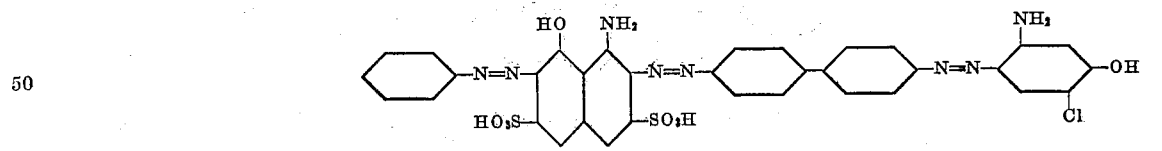

being in form of its alkali metal salts dark powders, dyeing cotton greenish-black shades of excellent fastness to acids.

4. The trisazodyestuff of the following formula:

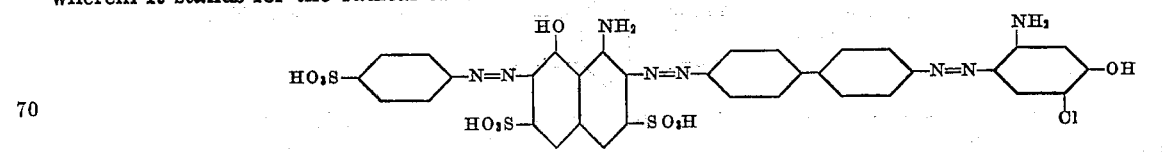

being in form of its alkali metal salts dark powders, dyeing leather black shades of good fastness to acids.

5. The trisazodyestuff of the following formula:
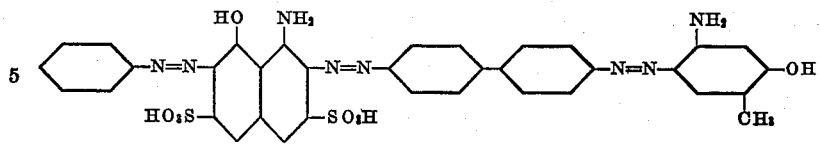
being in form of its alkali metal salts dark powders, dyeing cotton red shades of good fastness to acids and dyeing the different fibres in mixed fabrics the same shades.
HEINRICH CLINGESTEIN.
EUGEN GLIETENBERG.
OSKAR GOOS.